(12) United States Patent
Nozue et al.

(10) Patent No.: US 7,738,790 B2
(45) Date of Patent: *Jun. 15, 2010

(54) WDM TYPE PASSIVE OPTICAL NETWORK

(75) Inventors: Daiki Nozue, Fujisawa (JP); Hiroaki Miyata, Yokohama (JP); Noriyuki Sueyoshi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/323,084

(22) Filed: Nov. 25, 2008

(65) Prior Publication Data

US 2009/0080889 A1      Mar. 26, 2009

Related U.S. Application Data

(63) Continuation of application No. 11/478,361, filed on Jun. 30, 2006, now Pat. No. 7,502,563.

(30) Foreign Application Priority Data

Aug. 1, 2005    (JP) .............................. 2005-222483

(51) Int. Cl.
    *H04J 14/00*    (2006.01)
(52) U.S. Cl. .......................................... 398/69; 398/72
(58) Field of Classification Search .............. 398/68–73
    See application file for complete search history.

(56) References Cited

U.S. PATENT DOCUMENTS 5,335,104 A    8/1994    Johnson

| 6,411,410 | B1 | 6/2002 | Wright et al. |
| 7,016,608 | B1 | 3/2006 | Ball et al. |
| 7,295,778 | B2 * | 11/2007 | Lee et al. ..................... 398/72 |
| 2004/0264963 | A1 | 12/2004 | Kani et al. |
| 2005/0158048 | A1 | 7/2005 | Sung et al. |
| 2006/0115271 | A1 | 6/2006 | Hwang et al. |

FOREIGN PATENT DOCUMENTS

| JP | 08-008878 | 1/1996 |
| JP | 10-247896 A | 9/1998 |
| JP | 2003-521136 | 7/2003 |
| JP | 2004-222255 A | 8/2004 |
| JP | 2004-241855 | 8/2004 |
| JP | 2004-363948 A | 12/2004 |
| JP | 2005-354252 | 12/2005 |

OTHER PUBLICATIONS

United States Office Action issued in U.S. Appl. No. 12/323,059 dated Aug. 7, 2009.

* cited by examiner

*Primary Examiner*—Shi K Li
(74) *Attorney, Agent, or Firm*—McDermott Will & Emery LLP

(57) ABSTRACT

In a WDM type PON system, each ONU comprises an optical transmitter capable to transmit optical signals with variable wavelengths, an optical signal receiving filter variable its receiving wavelength, and a control unit. An OLT selects in response to a wavelength allocation request from each ONU, a transmitting wavelength and a receiving wavelength out of currently free wavelengths and allocates these wavelengths to the requester ONT. The control unit of the ONU switches the transmitting wavelength of the optical transmitter and the receiving wavelength of the optical signal receiving filter to the wavelengths specified in a response message from the OLT and starts data communication.

8 Claims, 11 Drawing Sheets

FIG. 5

WAVELENGTH MANAGEMENT TABLE 120

| WAVELENGTH INDEX ~121 | USE STATE ~122 | |
|---|---|---|
| 1 | UNDER USE | ~120-1 |
| 2 | UNDER USE | ~120-2 |
| ⋮ | ⋮ | |
| x | IDLE | |
| ⋮ | ⋮ | |
| y | UNDER ADJUSTMENT | |
| ⋮ | ⋮ | |
| m | IDLE | ~120-m |

WDM TYPE PASSIVE OPTICAL NETWORK

CLAIM OF PRIORITY

This application is a Continuation of U.S. application Ser. No. 11/478,361, filed Jun. 30, 2006, now U.S. Pat No. 7,502,563 claiming priority of Japanese Application No. 2005-222483, filed Aug. 1, 2005, the entire contents of each of which are hereby incorporated by reference.

BACKGROUND OF THE INVENTION (1) Field of the Invention

The present invention relates to a Passive Optical Network (PON) in which a plurality of subscriber connection apparatuses share a part of an optical transmission line and, more particularly, to a WDM type PON system utilizing an Optical Wavelength Division Multiplexing (WDM) technique for multiplexing a plurality of optical signals with different wavelengths in the PON.

(2) Description of Related Art

A Passive Optical Network (PON) system is known as one of access network systems for point to multi-points (one to N) connection using optical signals. The PON system comprises a central office side apparatus OLT (Optical Line Terminal) placed at a facility center operated by a network vendor such as a type 1 carrier and a plurality of subscriber connection apparatuses ONUs (Optical Network Units) placed at user homes, respectively. An optical fiber connected to the OLT is diverged by a splitter (optical branching filter) into a plurality of branch optical fibers on the order of 8 to 64 lines. Each ONU is connected to one of branch optical fibers. The PON system enables significant reduction in the cost for optical fiber network construction because a plurality of subscribers can share the optical fiber section between the splitter and the OLT.

A wavelength division multiplexing type PON (WDM-PON) applies the wavelength multiplexing technique in the shared fiber section of the PON and following two schemes are known:

(a) A first scheme allocates different wavelengths to upstream and downstream signals and a plurality of ONUs use the upstream wavelength $\lambda u$ and the downstream wavelength $\lambda d$ in a time division multiplexing (TDM) manner. In this case, an optical power splitter operable without power supply is used as the splitter and each ONU transmits and receives data within a time slot allocated from the OLT.

(b) A second scheme allocates dedicated upstream signal wavelength and downstream signal wavelength to each ONU. In this case, the splitter needs a filter function to separate a downstream signal transmitted in a wavelength multiplexing manner from the OLT into individual wavelengths and to distribute them to respective ONUs. According to the second scheme, each ONU can get data addressed to it by receiving only the wavelength allocated to it beforehand.

The first scheme allows the use of optical transceivers that are common for all ONUs because there is only a difference between the upstream signal wavelength and the downstream signal wavelength. Further, this scheme is regarded as economical, since the optical power splitter is applicable in the shared fiber section of the PON. Considering that a wider band would be required, in the future to transmit a large quantity of data over the PON, the second scheme improvable the transmission speed by wavelength multiplexing attracts attention. However, because each ONU has to use a specific wavelength different from that for other ONUs, the diversity of the ONUs increases in the first scheme, as the number of wavelengths to be used in the PON system increases. Consequently, this scheme increases the cost of the ONUs much greater than in the first scheme. In other words, the second scheme requires preparation of more diversified ONUs because all ONUs connected to the OLT transmit and receive optical signals at different wavelengths, respectively. In order to accommodate a new subscriber terminal to the OLT, it is necessary for the second scheme to prepare an ONU that has upstream/downstream wavelengths other than the wavelengths for the existing ONUs and to connect the ONU to an appropriate port of the splitter/filter and, thus, is not easy to add a new ONU.

As a prior art relating to the above ONU diversification problem in the WDM-PON system, for example, Japanese Unexamined Patent Publication No. 2004-222255 (patent document 1) proposes the application of spectrum slicing to share an upstream signal wavelength. In patent document 1, a wide-band light with a wide spectrum is used as an upstream signal to be transmitted from each ONU. Wide-band upstream optical signals are converted into narrow-band optical signals corresponding to ONUs by spectrally slicing the wide-band optical signals that are incoming from a plurality of branch optical fibers by a wavelength splitter, thereby to transmit the narrow-band optical signals to the OLT.

FIG. 9 shows a WDM-PON system setup proposed in patent document 1.

OLT 10 is connected via a wavelength splitter 20 to a plurality of ONUs 30 (30-1 to 30-$n$). The OLT multiplexes downstream optical signals having individual wavelengths ($\lambda d1, \lambda d2, \ldots, \lambda dn$) allocated to the plurality of ONUs 30 so that an wavelength multiplexed optical signal ($\lambda d1+\lambda d2+ \ldots +\lambda dn$) is transmitted to an optical fiber transmission path 50.

The wavelength multiplexed optical signal is separated into the individual wavelengths by the wavelength splitter 20 and branched away to the branch optical fibers as downstream optical signals with different wavelengths $\lambda d1, \lambda d2, \ldots, \lambda dn$ for each ONU. On the other hand, the ONUs 30-1 to 30-$n$ transmit upstream optical signals at the same wavelength $\lambda u$ for all the ONUs.

The wavelength splitter 20 spectrally slices the optical signals incoming from the branch optical fibers into upstream optical signals having different wavelengths $\lambda u1, \lambda u2, \ldots, \lambda un$ for each ONU, whereby the incoming signals are converted into a wavelength multiplexed optical signal ($\lambda u1+\lambda u2+ \ldots +\lambda un$), and transmitted to the optical fiber transmission path 50.

FIG. 10 illustrates a relationship between the upstream signal wavelengths and the downstream signal wavelengths used in the WDM-PON system of the above patent document 1.

Out of a wavelength grid in which wavelengths are sequenced at an equal center-to-center distance of $\Delta\lambda d$, an arbitrary wavelength $\lambda u$ is selected as the upstream signal wavelength and the remaining wavelengths $\lambda d1, \lambda d2$ through $\lambda dn$ are used as the downstream wavelengths. The downstream signal wavelengths have a wavelength error within $\Delta\lambda d/2$. The wavelength $\lambda u$ is spectrally sliced into multiple wavelengths $\lambda u1$ to $\lambda un$ corresponding to the ONUs 30-1 to 30-$n$, respectively. The spectrally sliced upstream signals are sequenced at an equal center-to-center distance of $\Delta\lambda u$ and have a wavelength error within $\pm\Delta\lambda u/2$.

In order to accommodate all channels of the upstream optical signals within a bandwidth corresponding to one channel of downstream optical signal, according to patent document 1, the center-to-center distance of $\Delta\lambda d$ for the wavelengths of the downstream optical signals is defined to be two times or more as much as the center-to-center distance of Δλu for the wavelengths of the upstream optical signals and the center-to-center distance for the wavelengths λu1 to λun of the upstream optical signals is narrowed sufficiently. In patent document 1, it is suggested that an optical filter for wavelength selection is removably installed in the optical transceiver unit of each ONU in order to receive a downstream signal at different wavelength for each ONU.

As a prior art that aimed at effective use of wavelength in the PON system, for example, Japanese Unexamined Patent Publication No. Hei 10-247896 (patent document 2) proposes a PON system in which each ONU dynamically switches a wavelength and a time slot for receiving a downstream signal in response to an instruction from the OLT.

FIG. 11 shows a WDM-PON system setup proposed in patent document 2.

OLT 10 is connected via a wavelength splitter 21 to a plurality of ONUs 30 (30-1 to 30-n). Each ONU 30 transmits upstream signal in a time slot designated from the OLT, using an optical signal at the same wavelength λx. The upstream signals transmitted from each ONU 30 are time division multiplexed (TDM) on an optical fiber 50 and arrive at the OLT. On the other hand, downstream signals are transmitted from the OLT 10 to the optical fiber 50 in a form of a wavelength multiplexed (WDM) signal with wavelengths λ1 and λ2, and branched to each ONU 30 through the optical splitter 21.

FIG. 12 illustrates a method of allocating to each ONU a receiving wavelength and a time slot for receiving downstream signals, proposed in patent document 2.

The OLT 10 transmits a frame A (TF1, λ1) and a frame C (TF2, λ1), each comprising an over header OH and four time slots, using the wavelength λ1, as shown in S1. In parallel with this, the OLT 10 transmits a frame B (TF1, λ2) and a frame D (TF2, λ2), each comprising an over header OH and four time slots T1 to T4, using the wavelength of λ2, as shown in S2. In the OH of each frame, as bandwidth allocation information, information designating ONUs to which the time slots T1 to T4 in the frame of the wavelength λ1 and the time slots T1 to T4 in the frame of the wavelength λ2 are allocated is set.

In the example shown here, the bandwidth allocation information "(λ2) ONU2355" for the frame A indicates that the time slots T1, T2, T3, T4 in the frame B which is transmitted at the wavelength λ2 in parallel with the frame A are allocated to ONU-2, ONU-3, ONU-5, ONU-5, respectively. The information "(λ1)ONU1144" indicates that the time slots T1, T2, T3, T4 in the frame A which is transmitted at the wavelength λ1 are allocated to ONU-1, ONU-1, ONU-4, ONU-4, respectively. In the OH of the frame B, the bandwidth allocation information corresponding to that for the frame A is set. For the subsequent frames C and D as well, ONUs to which the time slots T1, T2, T3, T4 are allocated are specified for each wavelength.

Each of the ONUs is provided with tunable optical filter and receives downstream signals from the OLT at the wavelength λ1 or λ2, selectively. Whether the current receiving wavelength is λ1 or λ2, each ONU can know its allocated time slot during receiving the OH. Accordingly, each ONU can receive downstream signals in the allocated time slot by appropriately switching to the receiving wavelength as instructed from the OLT. In the example shown, the ONU-4 should perform receiving operation in the third and fourth time slots of the frame A (TF1, λ1), in the first and second time slots of the frame D (TF2, λ2), and in the third and fourth time slots of the frame C (TF2, λ1).

As stated above, according to the PON system of patent document 1, selection of an ONU having an unused wavelength or a filter replacement work is required at the time of ONU installation, since an individual wavelength must be fixedly allocated to each ONU for receiving downstream optical signals. Further, this type of PON system involves increased management cost because it requires to record wavelengths currently used in preparation for increasing ONUs later.

On the other hand, the PON system of patent document 2 adopts time division multiplexing at the same wavelength for upstream signals. In principle, it also adopts time division multiplexing for downstream signals, and the number of time slots that can be allocated to each ONU is increased simply by increasing the number of wavelengths applied for downstream signals. Therefore, the PON system of patent document 2 is a modification example to the above-mentioned first scheme, but not a PON system of the second scheme.

SUMMARY OF THE INVENTION

An object of the present invention is to provide a WDM type PON system that has made increasing ONUs easier.

Another object of the present invention is to provide a WDM type PON system in which an optical power splitter is applicable to an optical fiber section of the PON.

Further object of the present invention is to provide a WDM type PON system that has made it possible to make effective use of communication resources in the optical fiber section and widen the communication bandwidth for each ONU by dynamically allocating to each ONU a dedicated wavelength different from the wavelengths allocated to other ONUs, for each of upstream and downstream signals.

In order to achieve the foregoing objects, in a WDM type PON system of the present invention, each subscriber connection apparatus ONU transmits and receives data, using a pair of individual wavelengths specified from a central office side apparatus OLT. The passive optical network comprises an optical fiber connected to the OLT, a plurality of branch optical fibers each connected to one of the ONUs, and an optical power splitter for distributing to the branch optical fibers a wavelength multiplexed downward optical signal transmitted from the OLT and combining upstream optical signals transmitted from the ONUs into a wavelength multiplexed signal which is transferred along the optical fiber to the OLT. The optical signals transmitted from the plurality of ONUs are input to the OLT as a wavelength multiplexed signal. To each ONU, a downstream wavelength multiplexed optical signal transmitted from the OLT is input.

One feature of the present invention resides in that the OLT selects a transmitting wavelength and a receiving wavelength out of currently idle wavelengths in response to a wavelength allocation request from each ONU, and allocates these wavelengths to the requester ONT.

Another feature of the present invention resides in that each ONU comprises an optical transmitter variable its transmitting wavelength, an optical signal receiving filter variable its receiving wavelength, and a control unit for controlling the transmitting wavelength of the optical transmitter and the receiving wavelength of the optical signal receiving filter, wherein the control unit issues a wavelength allocation request message to the OLT, switches the transmitting wavelength of the optical transmitter and the receiving wavelength of the optical signal receiving filter to specific wavelengths designated in a response message from the OLT, and starts data transmission and reception.

More specifically, in the WDM type PON system of the present invention, the central office side apparatus OLT comprises a wavelength management table having a plurality of entries each indicating an identifier of a wavelength available in the PON and a current state of the wavelength, and a control unit for searching the wavelength management table for an identifier of a pair of idle wavelengths in response to a wavelength allocation request from each ONU and allocating transmitting and receiving wavelengths corresponding to the wavelength identifier to the requester ONU. The control unit of each ONU transmits a wavelength allocation request to the OLT when the transmitting wavelength of the optical transmitter and the receiving wavelength of the optical signal receiving filter are at wavelengths that are common for all ONUs, and switches the transmitting wavelength of the optical transmitter and the receiving wavelength of the optical signal receiving filter to specific wavelengths allocated from the OLT when a wavelength allocation response message was received from the OLT.

In the WDM type PON system of the present invention, the OLT comprises, for example, a common interface unit for transmitting and receiving optical signals at wavelengths that are common for all ONUs, a plurality of individual interface units for transmitting and receiving optical signals at wavelengths corresponding to the wavelength identifiers registered in the wavelength management table, and an optical unit for separating a wavelength multiplexed optical signal incoming from the optical fiber into individual wavelength optical signals to selectively distribute the individual wavelength optical signals to the interface units corresponding to the wavelengths, and wavelength multiplexing the optical signals output from the interface units to transmit as a wavelength multiplexed optical signal to the optical fiber. The control unit of the OLT communicates control messages for wavelength allocation with each ONU through the common interface unit.

According to the present invention, when a new ONU is added to the PON, the engineer involved does not need to care for wavelengths to be used by the additional ONU, since each ONU is able to autonomously start data transmission and reception at individual transmitting and receiving wavelengths specified from the OLT.

BRIEF DESCRIPTION OF THE DRAWINGS

FIG. 5 exemplifies an embodiment of a wavelength management table 120 provided in a wavelength negotiator 300 of the central office side apparatus (OLT) 10.

DETAILED DESCRIPTION OF PREFERRED EMBODIMENTS

Preferred embodiments of the present invention will be described hereinafter with reference to the drawings.

Figure 1:
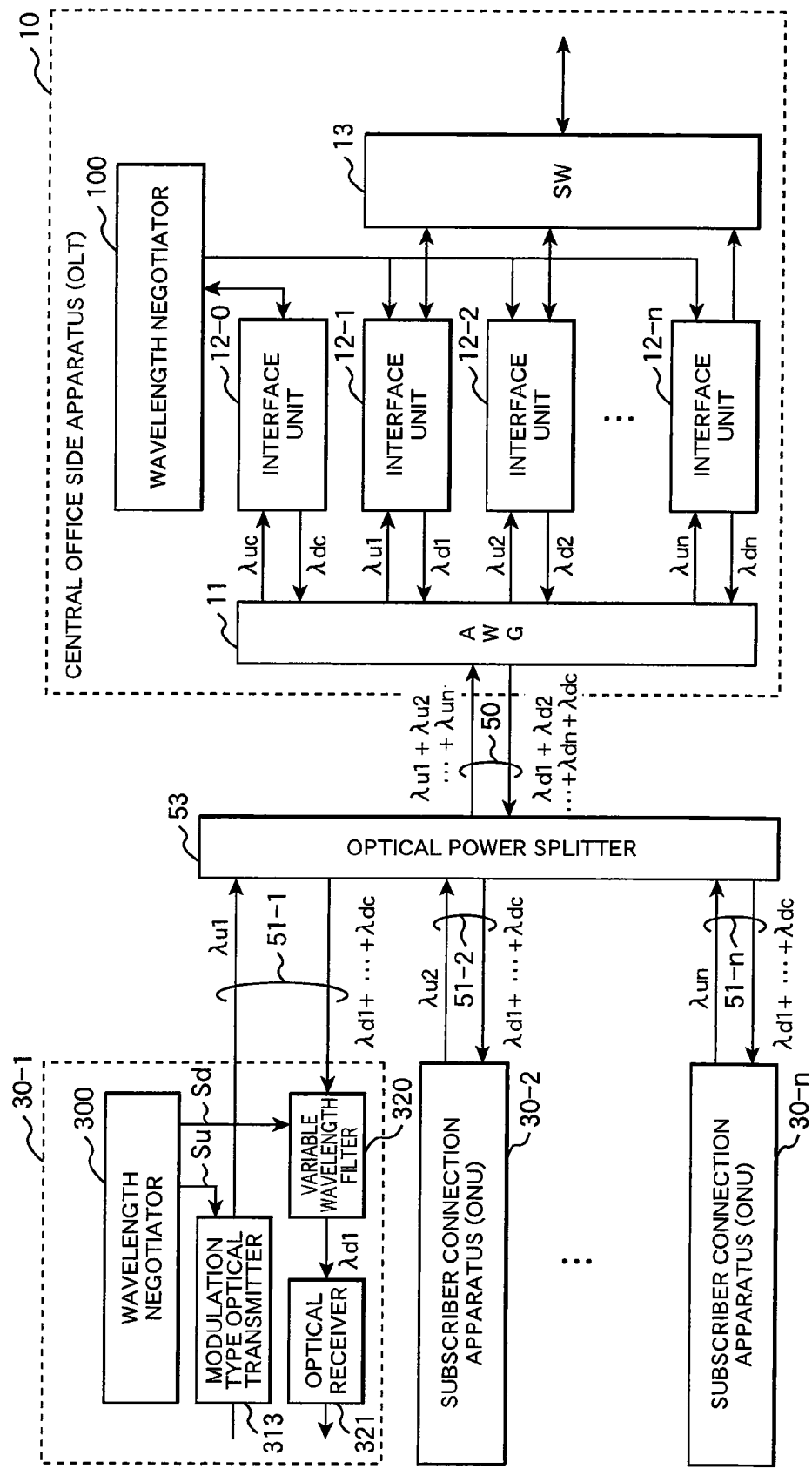
FIG. 1 is a structural diagram showing an embodiment of a WDM-PON system according to the present invention.

FIG. 1 is a structural diagram showing an embodiment of a WDM-PON system according to the present invention.

The PON system of the present invention comprises an central office side apparatus (OLT) 10, a plurality of subscriber connection apparatuses (ONUs) 30 (30-1 to 30-n), and a passive optical network in which an optical fiber 50 and a plurality of branch optical fibers 51 (51-1 to 51-n) are linked via an optical power splitter 53.

Each ONU 30-j (j=1 to n) is equipped with a modulation type optical transmitter 313 whose wavelength is variable and transmits an upstream optical signal to a branch optical fiber 51-j at a specific wavelength λuj (j=1 to n) allocated from the OLT. The upstream optical signal transmitted form each ONU is multiplexed together with upstream optical signals transmitted from other ONUs by the optical power splitter 53 and transmitted to the optical fiber 50 as a wavelength multiplexed signal.

The upstream optical signal of multiple wavelengths λu1 +λu2+ . . . +λun is wavelength demultiplexed by an Arrayed Waveguide Grating (AWG) 11 in the OLT 10 and the demultiplexed signals are selectively distributed to interface (INF) units 12 (12-1 to 12-n) corresponding to the wavelengths. In the example shown here, an optical signal at a wavelength λu1 transmitted from an ONU 30-1 is supplied to an INF unit 12-1, an optical signal at a wavelength λu2 transmitted from an ONU 30-2 is supplied to an INF unit 12-2, and an optical signal at a wavelength λun transmitted from an ONU 30-n is supplied to an INF unit 12-n, respectively.

Here, each of the INF units 12-1 to 12-n converts the upstream optical signal into an electrical signal, performs PON termination processing, and outputs the signal as an upstream packet. The upstream packet output from each INF unit is input to a higher-level apparatus (not shown) via a switching unit 13 and, after subjected to protocol conversion, if necessary, transferred onto a higher-level network such as the Internet.

On the other hand, packets received from the higher-level network are distributed to the INF units 12-1 to 12-n by the switching unit 13 and, after converted into PON frames, output as optical signals to the AWG 11. In the example shown here, the INF unit 12-1 outputs a downstream optical signal at a wavelength λd1, the INF unit 12-2 outputs a downstream optical signal at a wavelength λd2, and the INF unit 12-n outputs a downstream optical signal at a wavelength λdn to the AWG 11.

The AWG 11 multiplexes these downstream optical signals by wavelength multiplexing and transmits as a downstream optical signal of multiple wavelengths λd1+λd2+ . . . +λdn to the optical fiber 50. The wavelength multiplexed downstream optical signal passes through the splitter 53 without being wavelength demultiplexed and supplied to the ONUs 30-1 to 30-n. Each ONU 30-j (j=1ton) is equipped with a variable wavelength filter 320 at a pre-stage of an optical receiver 321. The variable wavelength filter 320 selectively receives only an optical signal at a specific wavelength λdj allocated from the OLT 10 and outputs it to the optical receiver 321. Here, the variable wavelength filter 320 of the ONU 30-1 selectively receives an optical signal at a wavelength λd1, the variable wavelength filter 320 of the ONU 30-2 selectively receives an optical signal at a wavelength λd2, and the variable wavelength filter 320 of the ONU 30-n selectively receives an optical signal at a wavelength λdn.

A feature of the present invention resides in that the OLT 10 and each ONU 30j are equipped with wavelength negotiators 100 and 300, respectively, and that the wavelength negotiator 100 of the OLT 10 allocates, in response to a wavelength allocation request from the wavelength negotiator 300 of the ONU 30j, an upstream optical signal wavelength λuj and a downstream optical signal wavelength λdj to be used by the ONU 30j.

The wavelength allocation request is transmitted, using a wavelength λuc that is common for all ONUs for control information transmission. An upstream optical signal at the wavelength λuc is distributed to a common INF unit 12-0 by the AWG 11 in the OLT 10. The common INF unit 12-0 converts the optical signal at the wavelength λuc into an electrical signal, performs PON termination processing, and outputs the signal as a control packet to the wavelength negotiator 100. A response packet for wavelength allocation, generated by the wavelength negotiator 100, is converted into a downstream optical signal at a wavelength λuc that is common for all ONUs by the common INF unit 12-0. The signal of the wavelength λuc is multiplexed with downstream optical signals at other wavelengths (λd1+λd2+ . . . +λdn) by wavelength multiplexing at the AWG 11 and transmitted to the optical fiber 50.

The wavelength negotiator 300 of the ONU 30j sets the receiving wavelength of the variable wavelength filter 320 to the common wavelength λdc, as long as the transmitting wavelength of the modulation type optical transmitter 313 is set to the common wavelength λuc. When wavelengths λuj and λdj to be used are specified by a wavelength allocation response packet from the OLT 10, the wavelength negotiator 300 switches the transmitting wavelength of the modulation type optical transmitter 313 from the common wavelength λuc to the dedicated wavelength λuj by using a control signal Su and switches the receiving wavelength of the variable wavelength filter 320 from the common wavelength λdc to the dedicated wave length λdj by using a control signal Sd.

Figure 2:
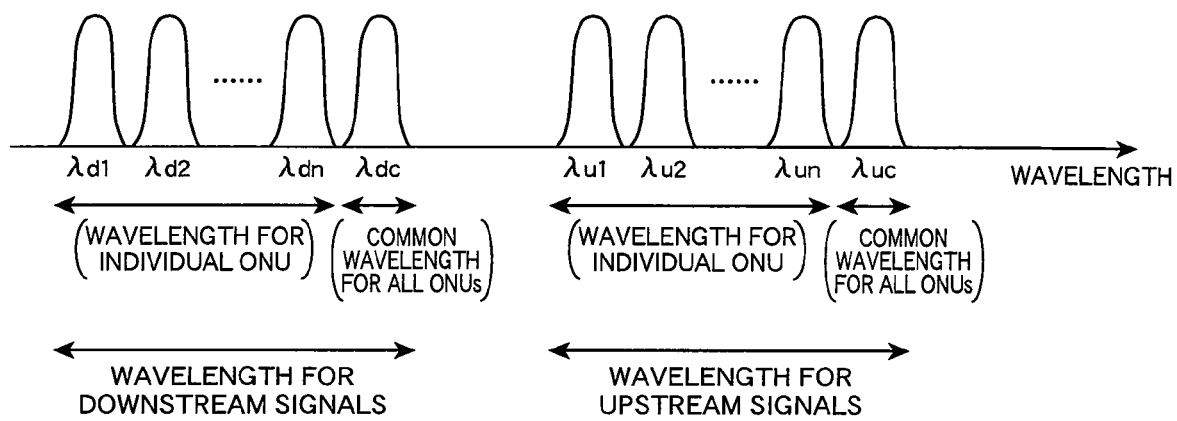
FIG. 2 illustrates a relationship between upstream optical signal wavelengths and downstream optical signal wavelengths used in the first embodiment of the invention.

FIG. 2 illustrates a relationship between upstream optical signal wavelengths and downstream optical signal wavelengths to be used in the present embodiment.

Wavelengths (λdc, λuc) that are common for all ONUs for control information transmission are prepared along with upstream optical signal wavelengths (λu1, λu2, . . . λun) and downstream optical signal wavelengths (λd1, λd2, . . . λdn) to be allocated to each ONU 30j. When issuing a wavelength allocation request, the wavelength negotiator 300 of each ONU 30j executes negotiation with the OLT 10 in a state where the transmitting wavelength of the modulation type optical transmitter 313 is set to λuc and the receiving wavelength of the variable wavelength filter 320 is set to λdc.

Figure 3:
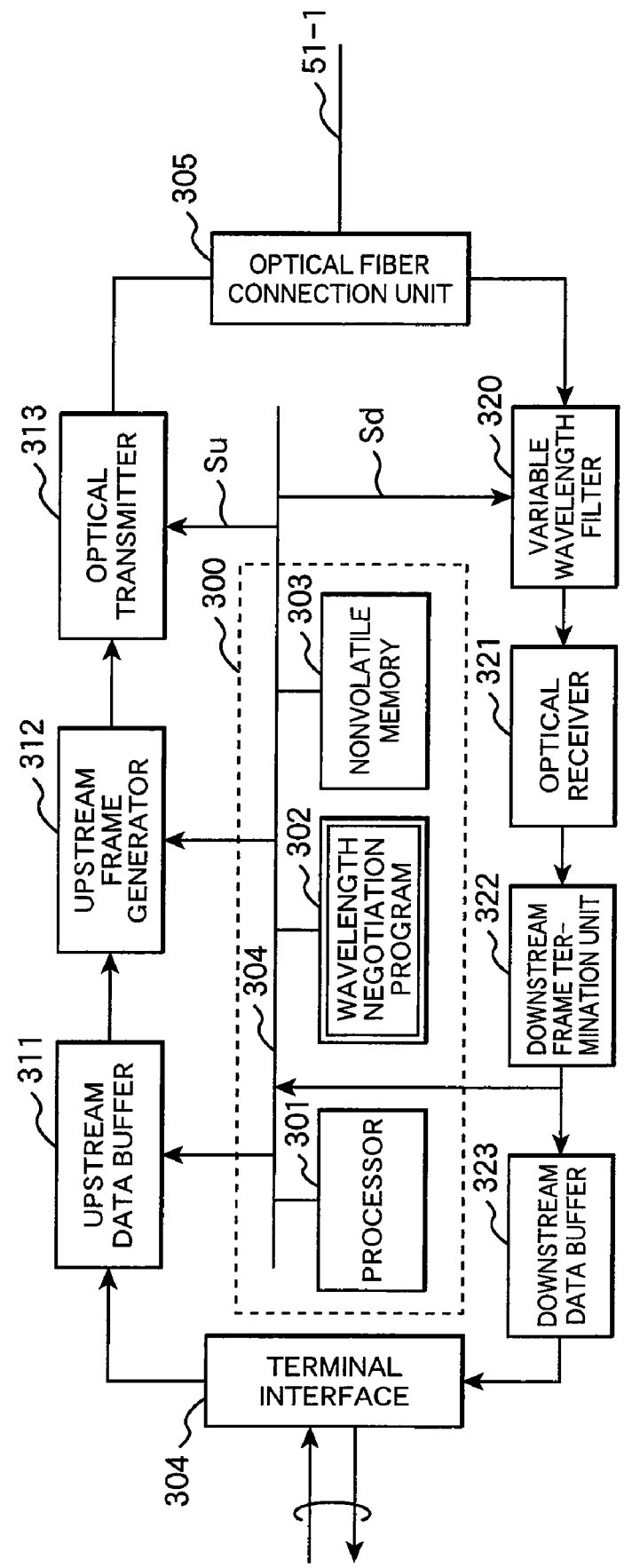
FIG. 3 is a structural diagram showing an embodiment of a subscriber connection apparatus (ONU) 30 shown in FIG. 1.

FIG. 3 shows an embodiment of a subscriber connection apparatus (ONU) 30-1. Other ONUs 30-2 to 30-n are configured in the same way as shown here.

The ONU 30-1 comprises a wavelength negotiator 300, a terminal interface 304 for connection to a subscriber terminal, an optical fiber connection unit 305 for connection to a branch optical fiber 51-1, and an upstream signal processing circuit and a downstream signal processing circuit provided between the terminal interface 304 and the optical fiber connection unit 305.

The upstream signal processing circuit comprises an upstream data buffer 311 for temporarily storing transmission data from a subscriber terminal, received through the terminal interface 304, an upstream frame generator 312 which edits transmission data read out from the upstream data buffer 311 into PON upstream frames (packets), and a modulation type optical transmitter (E/O converter) variable in transmitting wavelength, which converts upstream data output from the upstream frame generator 312 into an optical signal at a specific wavelength λu1 and outputs the optical signal to the optical fiber connection unit 305.

On the other hand, the downstream signal processing circuit comprises a variable wavelength filter 320 for selectively receiving an optical signal at a specific wavelength λd1 out of a wavelength multiplexed optical signal output from the optical fiber connection unit 305, an optical receiver (O/E converter) 321 for converting an optical signal output from the variable wavelength filter 320 into an electrical signal, a downstream frame termination unit (PON termination unit) 322 connected to the optical receiver 321, and a downstream data buffer 323 for temporarily storing received data output from the downstream frame termination unit (PON termination unit) 322 and outputting it to the terminal interface 304. The downstream frame termination unit 322 performs termination processing of PON downstream signals and analyzes the received frames (packets). If a control frame is received, the termination unit outputs the received frame to the wavelength negotiator 300. If a user frame is received, the termination unit outputs the received frame to the downstream data buffer 323.

In the present embodiment, the wavelength negotiator 300 comprises a processor 301, a main memory 302 for storing a wavelength negotiation program, a nonvolatile memory 303, and an internal bus 304 for interconnecting these components. In the main memory 302, various routines for implementing the functions of the ONU is stored besides the wavelength negotiation program. The processor 301 functions as a wavelength negotiator during the execution of the wavelength negotiation program and functions as the control unit of the ONU during the execution of any other program.

The nonvolatile memory 303 stores the wavelength negotiation program and other programs. These programs are copied into the main memory 302 by the processor 301 when the ONU is activated. The setting of the transmitting wavelength λu1 for the modulation type optical transmitter 313 and the setting of the receiving wavelength λd1 for the variable wavelength filter 320 are carried out by the processor 301 via the internal bus 304 and signal lines Su, Sd.

Figure 4:
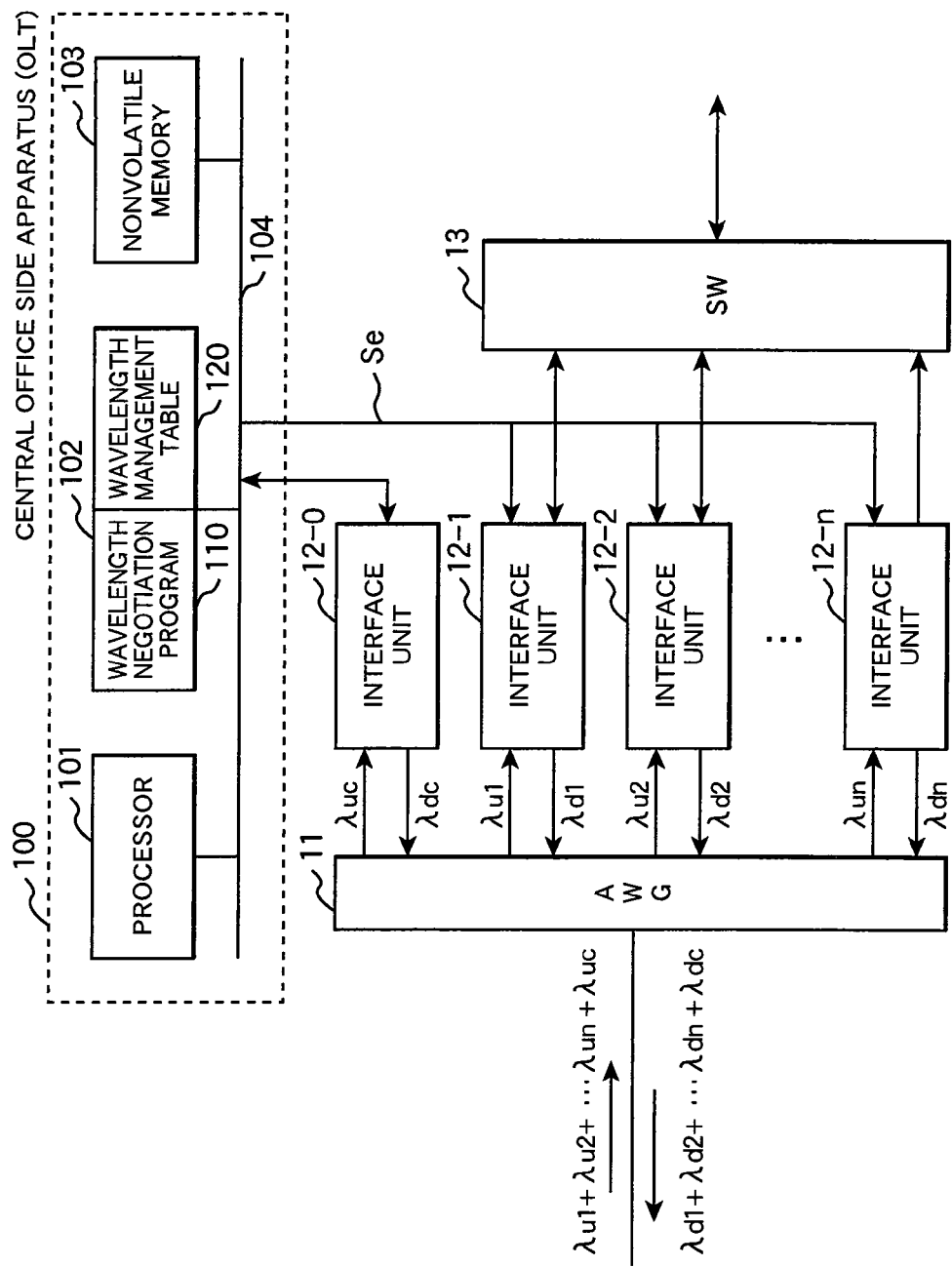
FIG. 4 is a structural diagram showing an embodiment of a central office side apparatus (OLT) 10 shown in FIG. 1.

FIG. 4 shows an embodiment of the central office side apparatus (OLT) 10.

The OLT 10 comprises an AWG 11, a wavelength negotiator 100, a switching unit 13, a common INF unit 12-0 for control frames, connected between the AWG 11 and the wavelength negotiator 100, and a plurality of individual INF units 12-1 to 12-n connected between the AWG 11 and the switching unit 13. In the present embodiment, the wavelength negotiator 100 comprises a processor 101, a main memory 102 for storing a wavelength negotiation program 110 and a wavelength management table 120, a nonvolatile memory 103, and an internal bus 104 for interconnecting these components.

In the main memory 102, various routines for implementing the functions of the OLT is stored besides the wavelength negotiation program. The processor 101 functions as a wavelength negotiator during the execution of the wavelength negotiation program and functions as the control unit of the OLT during the execution of any other program. The nonvolatile memory 103 stores the wavelength negotiation program and other programs as well as the wavelength management table 120 and other tables and these programs and tables are copied into the main memory 102 by the processor 101 when the OLT is activated.

The processor 101 carries out wavelength negotiation with each ONU via the common INF unit 12-0. Upon allocating wavelengths $\lambda uj$, $\lambda dj$ to an ONU 30-$j$, the processor 101 activates an individual INF unit 12-$j$ for the allocated wavelengths $\lambda uj$, $\lambda dj$ by using a control signal Se. Further, the processor 101 periodically monitors the operating state of the ONU 30-$j$ to which the wavelengths $\lambda uj$, $\lambda dj$ were allocated. When the response from the ONU 30-$j$ ceased, the processor 101 stops the operation of the relevant individual INF unit 12-$j$.

FIG. 5 exemplifies an embodiment of the wavelength management table 120 to be used by the wavelength negotiator 100 of the OLT 10 to manage the states of wavelength allocations to the ONUs.

The wavelength management table 120 comprises a plurality of entries 120-1 to 120-$m$ each indicating relationship between a wavelength index 121 (wavelength identifier) and use state 122 of the wavelength. The use state 122 of the wavelength indicates one of the following three states: "idle (free)," "under adjustment," and "under use."

Figure 6:
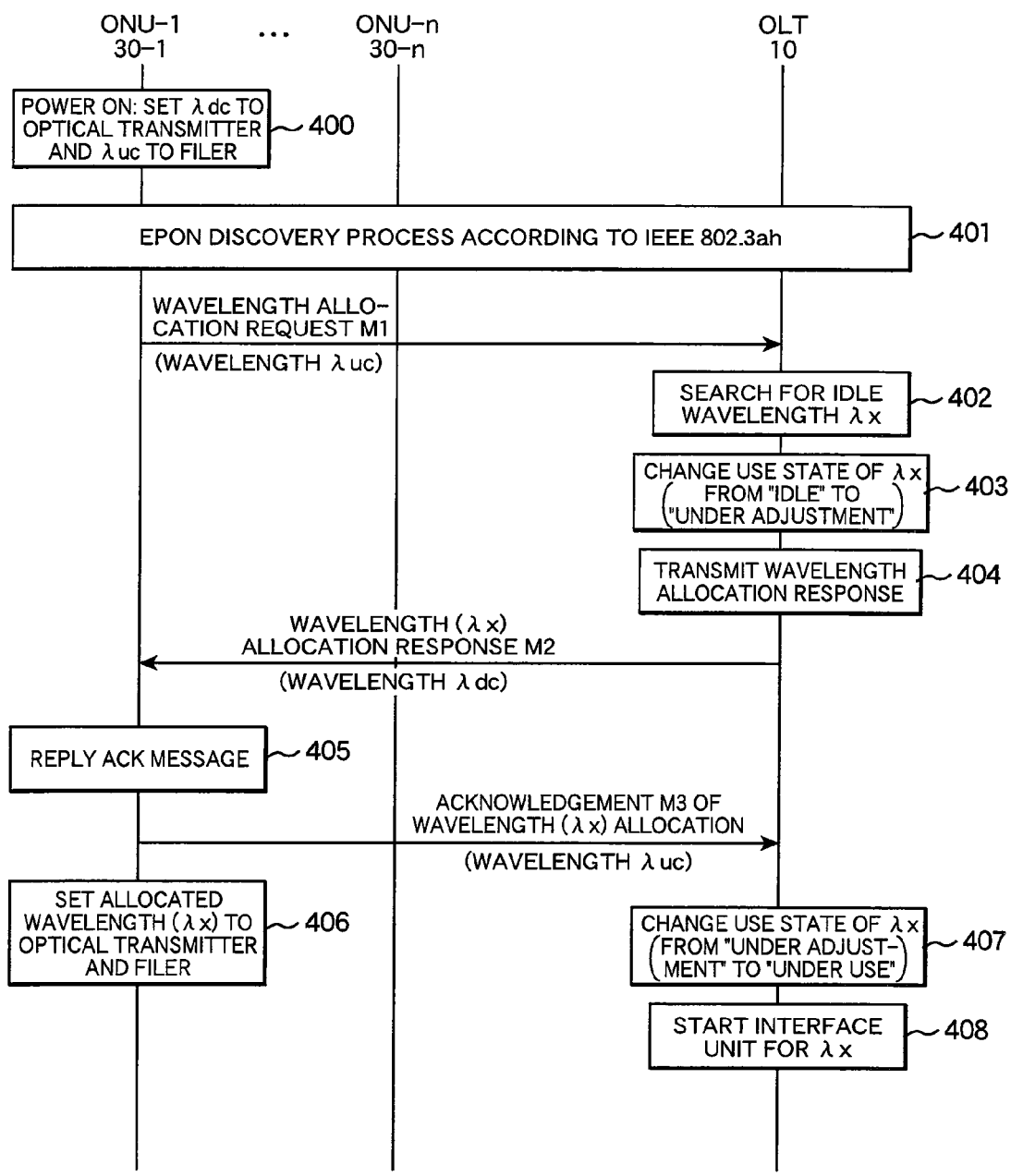
FIG. 6 is a sequence diagram of wavelength negotiation to be carried out in the PON system of the present invention.

FIG. 6 shows a sequence diagram of wavelength negotiation to be carried out in the PON system of the present invention. By way of example, a sequence starting with an available wavelength allocation request issued from an ONU-1 (30-1) to the OLT 10 will be described here.

When the ONU-1 (30-1) is powered on, the processor 301 sets the transmitting wavelength of the modulation type optical transmitter 313 to the common wavelength $\lambda uc$ and the receiving wavelength of the variable wavelength filter 320 to the common wavelength $\lambda dc$ (400) and establishes a session with the OLT 10 (401). This session is established, for example, by carrying out a connection sequence in the EPON Discovery process in compliance with IEEE 802.3ah. When the session with the OLT 10 has been established, the processor 301 of the ONU 30-1 transmits a wavelength allocation request message M1 to the OLT 10, using the common wavelength $\lambda uc$.

Upon receiving the wavelength allocation request message M1 from the ONU 30-1, the processor 101 of the OLT 10 executes the wavelength negotiation program. During wavelength negotiation with one ONU, the processor 101 places the wavelength management table 120 in an exclusive control state to inhibit access to the wavelength management table 120 by a wavelength allocation request occurring subsequently and searches the wavelength management table 120 for an idle wavelength $\lambda x$ (402). This searching for an idle wavelength $\lambda x$ means to search for a table entry 120-$k$ in which the use state 122 is "idle (free)" from the wavelength management table 120. This search for an idle wavelength $\lambda x$ (402) is sure to succeed, because the wavelength management table 120 has a sufficient number of table entries for allowing wavelength allocation to all ONUs under the control of the OLT 10.

When an idle wavelength $\lambda x$ was found, the processor 101 changes the use state 122 in the table entry 120-$k$ from "idle" to "under adjustment" (403) and releases the wavelength management table 120 from the exclusive control. After that, the processor 101 generates a response message M2 including identifiers of allocated wavelengths ($\lambda ux$ and $\lambda dx$) corresponding to the value of the wavelength index 121 in the table entry 120-$k$ and transmits the response message M2 to the ONU 30-1 at the common wavelength $\lambda dc$ through the INF unit 12-0 (404). Here, the wavelengths $\lambda ux$ and $\lambda dx$ to be allocated to the ONU 30-1 are arbitrary ones of idle wavelengths and the OLT 10 does not allocate the same wavelengths statically, every time in response to a wavelength allocation request from the ONU 30-1.

Upon receiving the wavelength allocation response message M2, the wavelength negotiator 300 (processor 301) of the ONU 30-1 transmits an wavelength allocation acknowledgement message M3 to the OLT 10 at the common wavelength $\lambda uc$ (405). Then, the processor 301 changes the transmitting wavelength of the modulation type optical transmitter 313 from the common wavelength $\lambda uc$ to the allocated wavelength $\lambda ux$ and changes the receiving wavelength of the variable wavelength filter 320 from the common wavelength $\lambda dc$ to the allocated wavelength $\lambda dx$ (406). If it is necessary to change the characteristics of the optical receiver 321 in accordance with the receiving wavelength of the variable wavelength filter 320, the processor 301 changes the characteristics of the optical receiver 321 in association with the change of the wavelength of the variable wavelength filter 320.

Upon receiving the wavelength allocation acknowledgement message M3 from the ONU 30-1, the processor 101 of the OLT 10 places the wavelength management table 120 in the exclusive control state again, changes the use state 122 in the table entry 120-$k$ from "under adjustment" to "under use" (407), and releases the wavelength management table 120 from the exclusive control. After that, the processor 101 activates the INF unit 12-$x$ corresponding to the wavelength index "x" of the table entry 120-$k$ (408).

Figure 7:
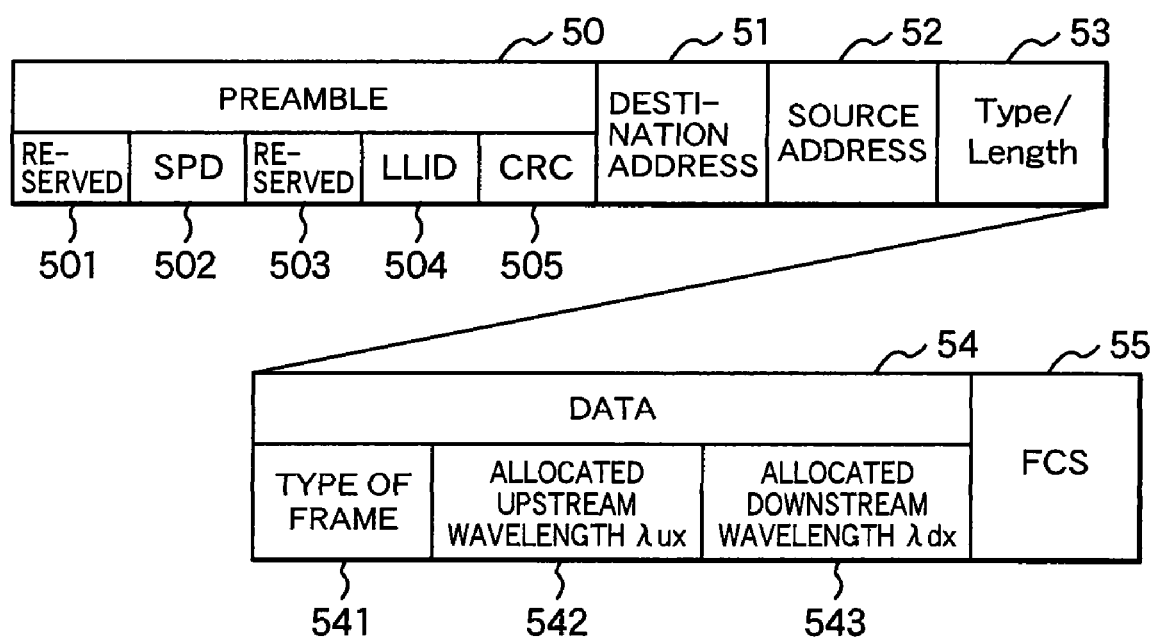
FIG. 7 shows an example of a frame format of control messages to be communicated during wavelength negotiation.

FIG. 7 shows an example of a frame format of control messages to be communicated between the ONU 30 and the OLT 10 in the above-described wavelength negotiation. The format shown here is based on the EPON frame format in compliance with IEEE 802.3ah.

The frame including a control message comprises a preamble 50, a destination address 51, a source address 52, a Type/Length field 53 for specifying the frame type at the MAC layer and data length, a data part 54, and a Frame Check Sequence (FCS) 55 to be used for error check of the frame.

The preamble comprises a reserved field 501, a Start of Packet Delimiter (SPD) 502, a reserved field 503, a Logical Link Identifier (LLID) 504, and a Cyclic Redundancy Check (CRC) 505. If the data part 54 includes a wavelength allocation request message M1 or a wavelength allocation acknowledgement message M3, the MAC address of the OLT 10 is set as the destination address 51 and the MAC address of the requester ONU is set as the source address 52. If the data part 54 includes a wavelength allocation response message M2, the MAC address of the requester ONU is set as the destination address 51 and the MAC address of the OLT 10 is set as the source address 52.

The data part 54 includes data particular to a control message for wavelength negotiation. As a frame type 541, specific code corresponding to the type of a control message M1, M2 or M3 is set. In a field of allocated upstream wavelength 542 and a filed of allocated downstream wavelength 543, the identifier of a wavelength $\lambda ux$ for upstream optical signals and the identifier of a wavelength $\lambda dx$ for downstream optical signals, allocated to the ONU 30-1 by the OLT 10, are set. In the case of a wavelength request message M1, the wavelength fields 542, 543 are empty.

When the OLT 10 transmits the wavelength allocation response message M2 to the ONU 30-1, ONUs that are already operating do not receive this response message M2 because their receiving wavelengths are set at individual wavelengths other than the common wavelength $\lambda dc$. If another ONU other than the ONU 30-1 has issued a wavelength allocation request message when the wavelength management table is placed in the exclusive control state, this ONU can receive the response message M2, because its variable wavelength filter 320 is set to the common wavelength λdc. However, since this ONU can discard the received message M2 that is not addressed to it by checking the destination address 51 of the received message, there is no possibility that the same wavelengths λux, λdx are allocated to a plurality of ONUs erroneously.

Figure 8:
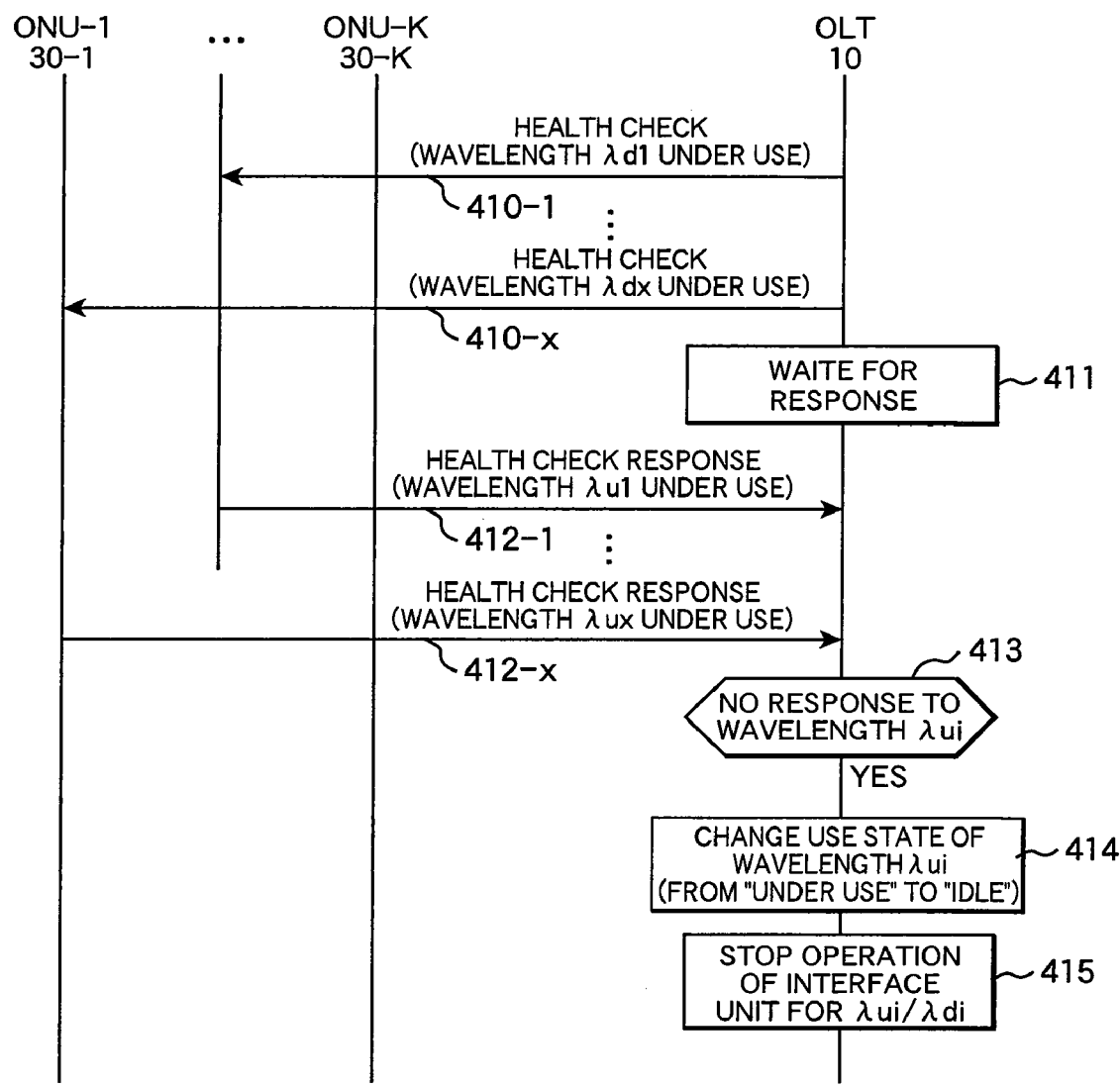
FIG. 8 is a sequence diagram of a health check to be carried out periodically by the OLT 10.
Figure 9:
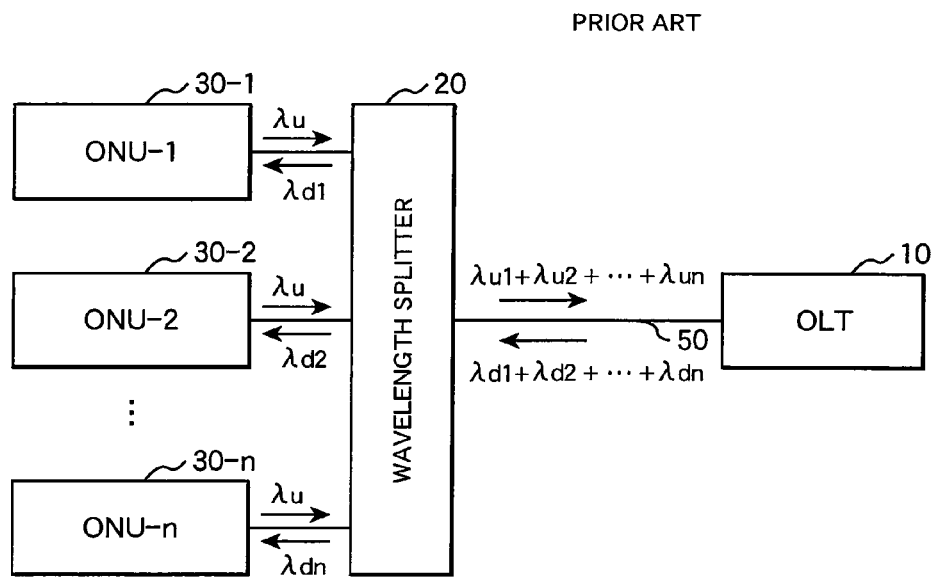
FIG. 9 shows one example of a PON system setup of prior art.
Figure 10:
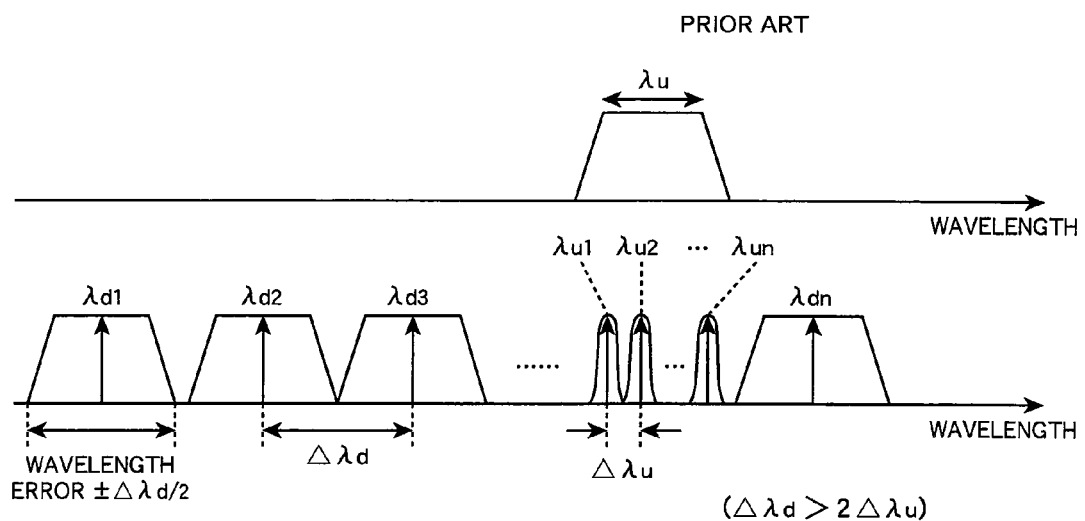
FIG. 10 illustrates a relationship between the upstream signal wavelengths and the downstream signal wavelengths used in the PON system of FIG. 9.
Figure 11:
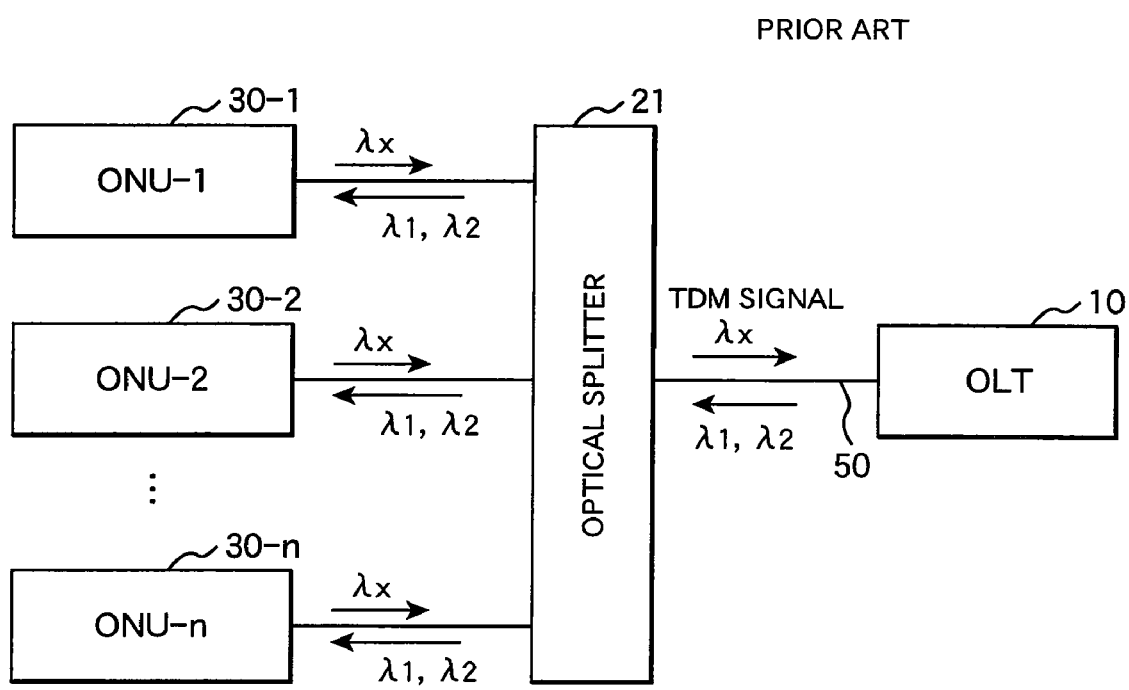
FIG. 11 shows another example of a PON system setup of prior art.
Figure 12:
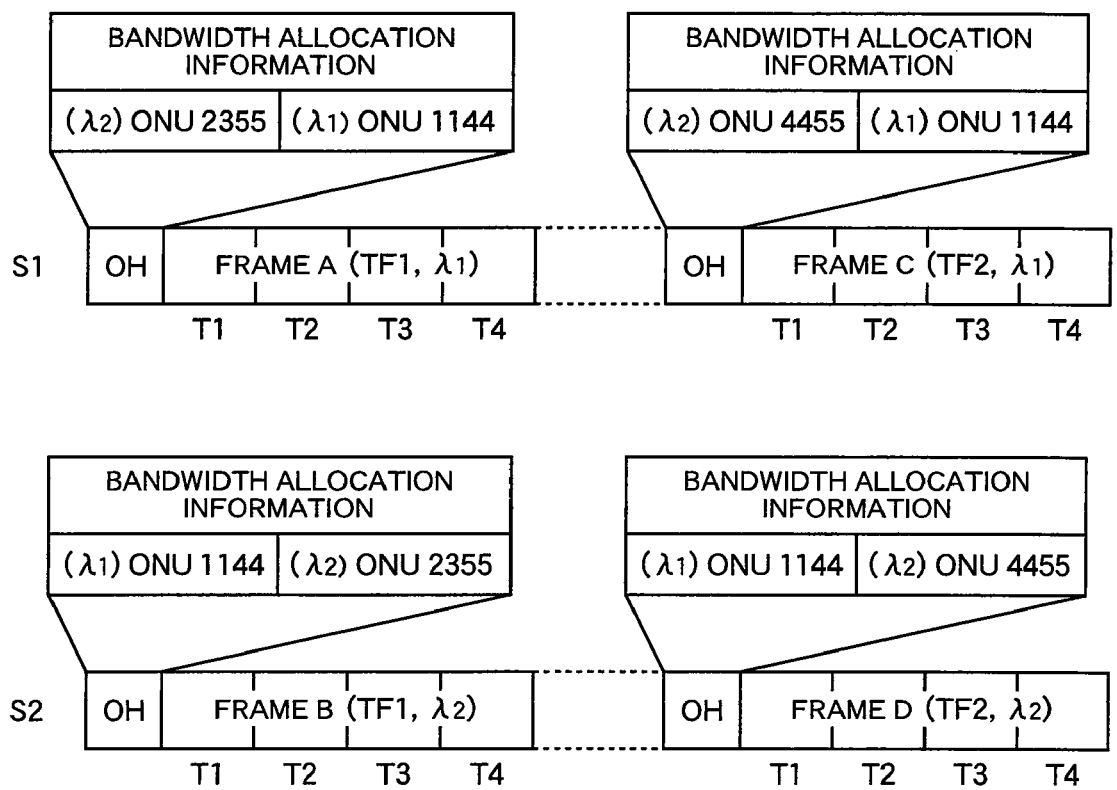
FIG. 12 illustrates a method of allocating receiving wavelengths and time slots for down signals in the PON system of FIG. 11.

FIG. 8 is a sequence diagram of a health check that the OLT 10 carries out periodically with ONUs in operation state.

The processor 101 of the OLT 10 refers to the wavelength management table 120, periodically issues health check messages (410-1 to 410-x) through all INF units 12-1 to 12-x (downstream wavelengths λd1 to λdx) corresponding to the values of the wavelength index 121 whose use state 122 is "under use", and waits for response from ONUs (411). Upon receiving the health check message, the processor of each operating ONU 301-j (j=1 to k) returns a response message to the OLT 10 (412-1 to 412-x).

If an INF unit 12-i was found that becomes unable to receive a response message within a given period of time after the health check message was transmitted due to, for example, the power-off of the corresponding ONU or other reason (413), the processor 101 of the OLT 10 changes the use state 122 from "under use" to "idle" in the table entry 120-i corresponding to the INF unit 12-i in the wavelength management table 120. Then, the processor 101 deactivates the INF unit 12-i (415). When an INF unit 12-i that has become unable to receive a response message is found, the processor 101 may place the wavelength management table 120 in the exclusive control state to change the use state in the table entry 120-i corresponding to the INF unit 12-i, and release the exclusive control after that.

According to the foregoing embodiments, it is possible to ensure a wide bandwidth because each subscriber connection apparatus ONU can transmit and receive data at its dedicated wavelength allocated from the OLT. In the case of increasing the number of ONUs, the engineer involved does not need to care for wavelengths to be used by the additional ONU because each ONU is able to autonomously start data transmission and reception at individual transmitting and receiving wavelengths specified from the OLT. Furthermore, since a simple optical power splitter that does not need to have a wavelength separation function is applicable to the PON, it is possible to make relatively smooth transition from a conventional PON system using the optical power splitter to a WDM-PON.

What is claimed is:

1. A WDM (Wavelength Division Multiplexing) type PON (Passive Optical Network) system in which a central office side apparatus OLT (Optical Line terminal) and a plurality of subscriber connection apparatuses ONUs (Optical Network Units) are connected by a passive optical network and each of said ONUs communicates data with said OLT, using its specific upstream and downstream optical signal wavelengths that are not used by the other ONUs, said passive optical network comprising an optical fiber connected to said OLT, a plurality of branch optical fibers each connected to one of said ONUs, and a splitter for distributing to said branch optical fibers a wavelength multiplexed downstream optical signal transmitted from said OLT and combining upstream optical signals transmitted from said ONUs into a wavelength multiplexed signal which is transferred along the optical fiber to said OLT, each of said ONUs comprising an optical transmitter variable its transmitting wavelength for upstream optical signals, an optical signal receiving filter variable its receiving wavelength, and a control unit for controlling the transmitting wavelength of the optical transmitter and the receiving wavelength of the optical signal receiving filter, said OLT comprising a wavelength management table having a plurality of entries each indicating an identifier of a pair of wavelengths available in said passive optical network and a current use state of the wavelengths, and a control unit for searching the wavelength management table for an identifier of idle state wavelengths in response to a wavelength allocation request from each of said ONUs, and allocating a pair of a transmitting wavelength and a receiving wavelength corresponding to the searched identifier to the requester ONU by transmitting a wavelength allocation response indicating the pair of the transmitting wavelength and the receiving wavelength to the requester ONU, wherein the control unit of each of said ONUs transmits the wavelength allocation request to said OLT, in the state where the transmitting wavelength of the optical transmitter and the receiving wavelength of the optical signal receiving filter are set at predetermined wavelengths common for all ONUs, and wherein the control unit of said ONU switches the transmitting wavelength of the optical transmitter and the receiving wavelength of the optical signal receiving filter to specific wavelengths allocated from said OLT, in response to said wavelength allocation response message, thereby performing data transmission and reception by continuously occupying the specific wavelengths as dedicated wavelengths while the ONU is in an operating state.

2. The WDM type PON system according to claim 1, wherein said OLT further comprises:

a common interface unit for transmitting and receiving optical signals at wavelengths that are common for all said ONUs;

a plurality of individual interface units for transmitting and receiving optical signals at wavelengths corresponding to wavelength identifiers registered in said wavelength management table; and an optical unit for separating a wavelength multiplexed optical signal incoming from said optical fiber into individual wavelength optical signals to selectively distribute the individual wavelength optical signals to the interface units corresponding to the individual wavelengths, and wavelength multiplexing the optical signals output from the interface units to transmit as said wavelength multiplexed downstream optical signal to said optical fiber, wherein the control unit of said OLT communicates control messages for wavelength allocation with each of said ONUs though said common interface unit.

3. The WDM type PON system according to claim 2, wherein the control unit of said OLT activates one of said individual interface units after allocating a transmitting wavelength and a receiving wavelength to one of said ONUs, said activated individual interface unit transmitting and receiving optical signals at said allocated transmitting wavelength and said allocated receiving wavelength.

4. The WDM type PON system according to claim 3, wherein the control unit of said ONU having received said wavelength allocation response message from said OLT transmits a wavelength allocation acknowledgement message to said OLT, and the control unit of said OLT actives said individual interface unit after receiving the wavelength allocation acknowledgement message.

5. The WDM type PON system according to claim 4, wherein the control unit of said OLT changes, in response to said wavelength allocation acknowledgement message, the use state of wavelength to in-use state for an entry corresponding to said allocated wavelength identifier in said wavelength management table.

6. The WDM type PON system according to claim 2, wherein the control unit of said OLT periodically transmits control messages for checking operating state of ONUs through said individual interface units specified by the identifiers of the wavelengths that are registered as in use in said wavelength management table, and changes the use state to idle state in an entry of said wavelength management table, having a wavelength identifier corresponding to the individual interface unit that failed to receive a response message from the corresponding ONU within a given period of time.

7. The WDM type PON system according to claim 6, wherein the control unit of said OLT deactivates the individual interface unit that failed to receive a response message from the corresponding ONU within a given period of time.

8. The WDM type PON system according to claims 1, wherein the control unit of each of said ONUs issues said wavelength allocation request message after executing a predetermined communication sequence for connecting to said OLT.

* * * * *